United States Patent
Narayanan et al.

(10) Patent No.: US 9,742,657 B2
(45) Date of Patent: Aug. 22, 2017

(54) METHOD AND SYSTEM FOR RESYNCHRONIZATION OF FORWARDING STATES IN A NETWORK FORWARDING DEVICE

(71) Applicant: Telefonaktiebolaget L M Ericsson (publ), Stockholm (SE)

(72) Inventors: Bhalaji Narayanan, Bangalore (IN); Shuva Jyoti Kar, Bangalore (IN); V L N Mehar Simhadri, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 354 days.

(21) Appl. No.: 14/726,258

(22) Filed: May 29, 2015

(65) Prior Publication Data

US 2016/0352613 A1    Dec. 1, 2016

(51) Int. Cl.
*H04L 12/28* (2006.01)
*H04L 12/755* (2013.01)
*H04L 29/08* (2006.01)
*H04L 12/24* (2006.01)

(52) U.S. Cl.
CPC ........ *H04L 45/021* (2013.01); *H04L 41/0866* (2013.01); *H04L 67/1095* (2013.01)

(58) Field of Classification Search
CPC ..... H04L 45/64; H04L 45/302; H04L 48/021; H04L 67/1095; H04L 12/755; H04L 29/08
See application file for complete search history.

(56) References Cited

U.S. PATENT DOCUMENTS

2009/0052445 A1   2/2009   Folkes
2013/0276135 A1*  10/2013  Conklin ............... G06F 21/554
                                            726/27
2013/0318243 A1*  11/2013  Chinthalapati ......... H04L 45/24
                                            709/226

(Continued)

FOREIGN PATENT DOCUMENTS

EP    2 806 603 A1   11/2014
EP    2 874 354 A1   5/2015

OTHER PUBLICATIONS

Eugene Nikanorov et al., "Graceful ovs-agent restart", Openstack cloud software, May 11, 2015, 1 page.

(Continued)

*Primary Examiner* — Andrew Lee
(74) *Attorney, Agent, or Firm* — Nicholson De Vos Webster & Elliott LLP

(57) ABSTRACT

A method, in a network controller of a control plane in a software defined network (SDN) coupled to a network element (NE) of a data plane in the SDN, of resynchronizing forwarding table entries of the NE according to forwarding table entries of the network controller is disclosed. The method includes causing the NE to update a first subset of forwarding table entries from a set of one or more of forwarding table entries to include a post-synchronization indicator. The method continues with causing the NE to delete, following the update of the first subset of forwarding table entries, a second subset of zero or more forwarding table entries from the set of forwarding table entries, where each forwarding table entry from the second subset includes a pre-synchronization indicator.

19 Claims, 11 Drawing Sheets

(56) References Cited

U.S. PATENT DOCUMENTS

| | | | | |
|---|---|---|---|---|
| 2014/0241349 | A1* | 8/2014 | Yoon | H04L 47/10 370/389 |
| 2015/0043589 | A1* | 2/2015 | Han | H04L 45/38 370/392 |
| 2015/0063112 | A1* | 3/2015 | Wu | H04L 45/302 370/235 |
| 2015/0215202 | A1* | 7/2015 | Sauer | H04L 45/38 370/256 |
| 2015/0281073 | A1* | 10/2015 | Kotha | H04L 45/745 370/392 |
| 2016/0149779 | A1* | 5/2016 | Sampath | H04L 43/0817 370/250 |
| 2016/0197831 | A1* | 7/2016 | De Foy | H04L 45/7453 370/392 |
| 2016/0254997 | A1* | 9/2016 | Kurudi Matada | H04L 45/64 370/392 |
| 2016/0359745 | A1* | 12/2016 | Hao | H04L 12/46 |
| 2017/0093686 | A1* | 3/2017 | Uttaro | H04L 45/021 |

OTHER PUBLICATIONS

Bug #1383674; "Restarting neutron openvswitch agent causes network hiccup by throwing away all flows", Openstack cloud software, Oct. 21, 2014, 20 pages.
"OpenFlow Switch Specification; Version 1.5.0 (Protocol version 0x06)", Open Networking Foundation, Dec. 19, 2014, pp. 1-277.
"Cookie Enhancements—OpenFlow Wiki", Open Networking Foundation, retrieved from URL: http//archive.openflow.org/wk/index.php/Cookie_Enhancements, retrieved on May 21, 2015, 4 pages.
"OpenFlow Switch Specification," Open Networking Foundation, Version 1.3.1 (Wire Protocol 0x04), Sep. 6, 2012, pp. 1-128.
"OpenFlow Switch Specification," Open Networking Foundation, Version 1.5.0 (Protocol version 0x06), Dec. 19, 2014m pp. 1-277.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
R. Braden, "Towards a Transport Service for Transaction Processing Applications," Sep. 1985, 10 pages, Network Working Group, Request for Comments: 955.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
R. Braden, "T/TCP—TCP Extensions for Transactions Functional Specification," Jul. 1994, 38 pages, Network Working Group, Request for Comments: 1644.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
D. Thaler, et al., "Multipath Issues in Unicast and Multicast Next-Hop Selection," Nov. 2000, 9 pages, Network Working Group, Request for Comments: 2991, The Internet Society.
C. Hopps, "Analysis of an Equal-Cost Multi-Path Algorithm," Nov. 2000, 8 pages, Network Working Group, Request for Comments: 2992, The Internet Society.
E. Rosen, et al., "Multiprotocol Label Switching Architecture," Jan. 2001, 61 pages, Network Working Group, Request for Comments: 3031, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.

(56) References Cited

OTHER PUBLICATIONS

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

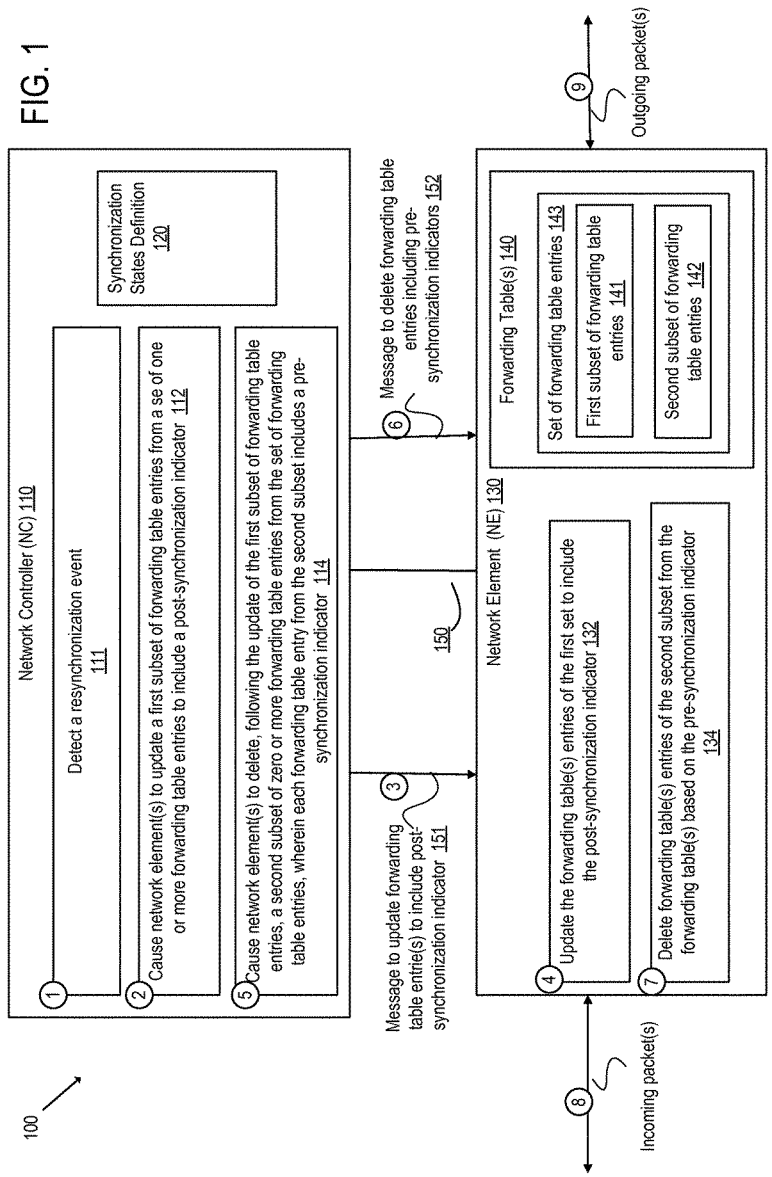

Cause the NE to update the first subset of forwarding table entries from the set of one or more forwarding table entries to include a post-synchronization indicator
112

Responsive to detecting the resynchronization event, identify the first subset of forwarding table entries based on the forwarding table entries of the network controller
202

Identify the post-synchronization indicator associated with the set of forwarding table entries
204

When the set of forwarding table entries is a set of flow table entries associated with a family of flows, identify the post-synchronization indicator at least in part by identifying a cookie values associated with the family of flows. 206

When the set of forwarding table entries is a set of group table entries associated with a family of groups, identify the post synchronization indicator and pre-synchronization indicator at least in part using a group property of type cookie cookie mask
208

Send a message to the NE to update the first subset of forwarding table entries to include the post-synchronization indicator
210

Send a message to the NE to update the first subset of one or more flow table entries associated with a family of flows to include a cookie value associated the family of flows, where the cookie value is a post-synchronization indicator
212

Send a message to the NE to update the first subset of one or more group table entries associated with a family of groups to update a property of the group with a post-synchronization value associated with the family of groups 214

FIG. 2A

Cause network element(s) to delete, following the update of the first set of forwarding table entries, a second set of zero or more forwarding table entries from the set of forwarding table entries, wherein each forwarding table entry from the second set includes a pre-synchronization indicator
114

Identify the pre-synchronization indicator, where the pre-synchronization indicator is associated with the set of forwarding table entries
216

When the set of forwarding table entries is a set of flow table entries associated with a family of flows, identify the pre-synchronization indicator at least in part by identifying a cookie value associated with the family of flows 218

When the set of forwarding table entries is a set of group table entries associated with a family of groups, identify the pre-synchronization indicator at least in part by identifying a value for a group property of type cookie/cookie mask with the family of groups 220

Send a message to the NE to delete forwarding table entries, where each forwarding table entry includes a pre-synchronization indicator
222

Send a message to the NE to delete flow table entries of a family of flows based on the pre-synchronization cookie value 224

Send a message to the NE to delete the group table entries of a family of groups based on a group property 226

FIG. 2B

Update the forwarding table(s) entries of the first set to include the post-synchronization indicator upon receipt of a message from the network controller
132

Update the flow table entries of the first set to include a post-synchronization value of the cookie and cookie mask of the entries upon receipt of a message from the network controller
316

Update the group table entries of the first set to include a post-synchronization value of a group property of type cookie and cookie mask upon receipt of a message from the network controller
318

FIG. 3A

Upon receipt of a message from the network controller, delete forwarding table entries based on a pre-synchronization indicator included in the message
336

Upon receipt of a message from the network controller, delete flow table entries based at least on a cookie value included in the message
346

Upon receipt of a message from the network controller, delete group table entries based on a pre-synchronization group property value included in the message
356

FIG. 3B

```
struct a_flow_mod_cookie {
    struct ofp_header header;
412
    uint32_t experimenter;                         /* OFPT_EXPERIMENTER. */
414
    uint32_t exp_type;                             /* A_EXPERIMENTER_ID. */
416
    uint64_t cookie;                               /* A_FLOW_MOD_COOKIE. */
418
    uint64_t cookie_mask;                          /* Opaque network ontroller-issued identifier. */
420                                                /* Mask used to restrict the cookie bits
                                                      that must match when the command is
                                                      OFPFC_MODIFY* or OFPFC_DELETE*. */
    uint8_t table_id;                              /* ID of the table to put the flow in.
422                                                   OFPTT_ALL can also be used to delete
                                                      matching flows from all tables. */
    uint16_t idle_timeout;                         /* Idle time before discarding (seconds). */
424
    uint16_t hard_timeout;                         /* Max time before discarding (seconds). */
426
    uint16_t priority;                             /* Priority level of flow entry. */
428
    uint16_t flags;                                /* Bitmap of OFPFF_* flags. */
430
    uint8_t pad[7];
432
    struct ofp_match match;                        /* Fields to match. Variable size. */
434
    struct ofp_instruction_header instructions[0]; /* Instruction set - 0 or more. The length
436                                                   of the instruction set is inferred from
                                                      the length field in the header. */
};
OFP_ASSERT(sizeof(struct a_flow_mod_cookie) == 60);
```

/* Experimenter property types */
        enum a_type {
512         A_PROPERTY_TYPE_COOKIE = 100,
514         A_PROPERTY_TYPE_COOKIE_MASK = 101
        };
```

FIG. 5A

```
500B struct a_group_mod_property {
516     struct ofp_header header;        /* OFPT_EXPERIMENTER. */
518     uint32_t experimenter;           /* A_EXPERIMENTER_ID. */
520     uint32_t exp_type;               /*A_TYPE_GROUP_MOD_PROPERTY*/
522     uint16_t command;                /* One of A_GRPPROP_*. */
524     uint32_t group_id;               /* Group identifier. */
526     uint16_t bucket_array_len;       /* The length of the bucket array is
                                            bucket_array_len bytes. */
528     struct ofp_bucket buckets[0];
530     struct ofp_group_prop_header properties[0];
    };

OFP_ASSERT(sizeof(struct a_group_mod_property) == 36);
```

FIG. 5B

```
500C
        enum a_group_property_command {
532         A_GRPPROP_ADD
534         A_GRPPROP_REMOVE,
536         A_GRPPROP_MODIFY
            };
```

FIG. 5C

```
500D
        struct a_group_del_property {
538         struct ofp_header header; /* OFPT_EXPERIMENTER. */
540         uint32_t experimenter; /* A_EXPERIMENTER_ID. */
542         uint32_t exp_type; /* A_TYPE_GROUP_DEL_PROPERTY. */
544         uint8_t pad[4];
546         struct ofp_group_prop_header properties[0];
            /* Property <Key,Value> entries */
        };

OFP_ASSERT(sizeof(struct a_group_del_property) == 28);
```

FIG. 5D

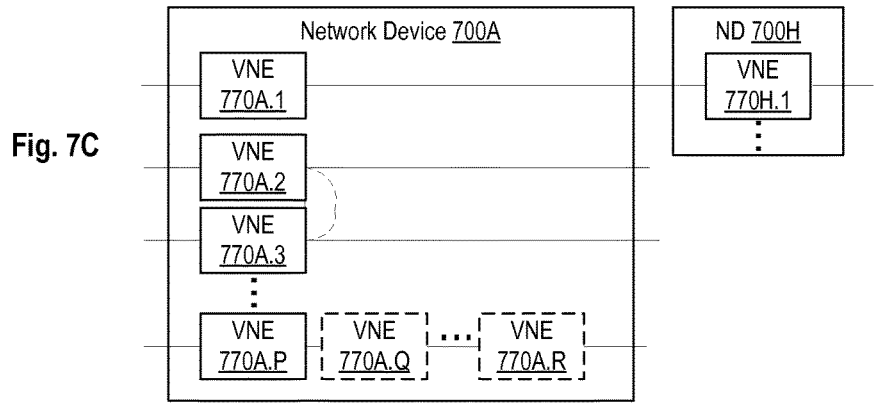
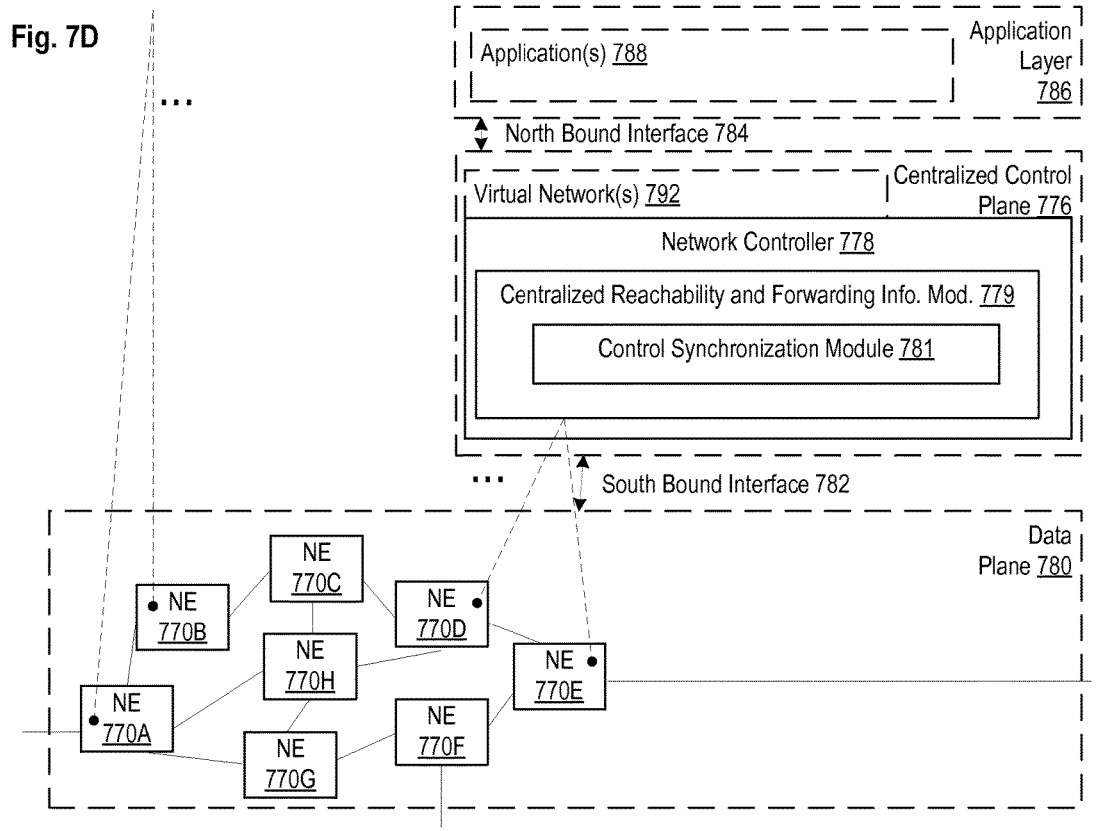
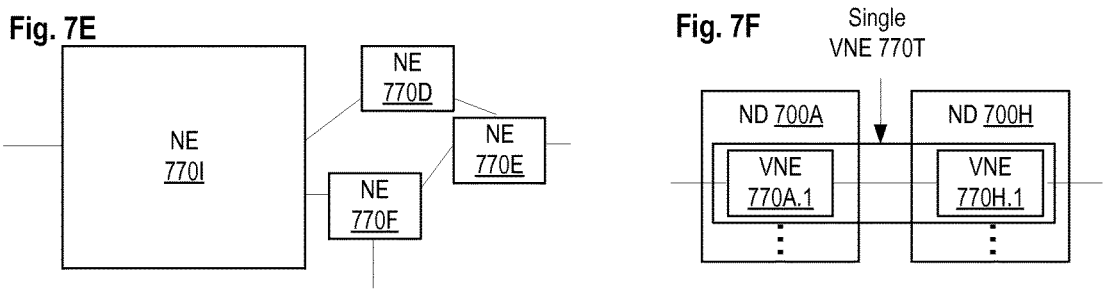

METHOD AND SYSTEM FOR RESYNCHRONIZATION OF FORWARDING STATES IN A NETWORK FORWARDING DEVICE

FIELD

Embodiments of the invention relate to the field of software-defined networking (SDN); and more specifically, to a method and system to methods and system for resynchronization of forwarding states in a network forwarding device.

BACKGROUND

Software Defined Networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane). In such a system, a network controller, which is typically deployed as a cluster of server nodes, has the role of the control plane and is coupled to one or more network elements that have the role of the data plane. Each network elements being implemented on one or multiple network devices. The network controller communicates with the network elements using a SDN protocol. For implementing SDN, the Open Networking Foundation (ONF), an industrial consortium focusing on commercializing SDN and its underlying technologies, has defined a set of open commands, functions, and protocols. The defined protocol suites are known as the OpenFlow (OF) protocol. The network controller, acting as the control plane, may then program the data plane on the network elements by causing packet handling rules to be installed on the forwarding network elements using OF commands and messages. These packet handling rules may have criteria to match various packet types as well as actions that may be performed on those packets. For example, the network controller may program the network elements to forward packets with a specific destination address a certain way in the network.

In such a deployment environment, there will be instances where the connectivity between the control plane and the data plane gets disrupted. The disruption of the connectivity may be due to various reasons (e.g., one of the control-plane nodes restarted or crashed, one of the data-plane forwarding network elements restarted, intermittent/transient network issues in the control plane—data plane connectivity, an application restarting on the control plane, etc.).

These disruption scenarios require resynchronization of the forwarding states of the control plane with the forwarding states at the forwarding network elements to ensure proper recovery of the network system from the disconnection.

SUMMARY

A method, in a network controller of a control plane in a software defined network (SDN) coupled to a network element (NE) of a data plane in the SDN, of resynchronizing forwarding table entries of the NE according to forwarding table entries of the network controller is disclosed. The method includes causing the NE to update a first subset of forwarding table entries from a set of one or more forwarding table entries to include a post-synchronization indicator. The method continues with causing the NE to delete, following the update of the first subset of forwarding table entries, a second subset of zero or more forwarding table entries from the set of forwarding table entries, where each forwarding table entry from the second subset includes a pre-synchronization indicator.

A network controller of a control plane in a software defined network (SDN) coupled to a network elements (NE) of a data plane in the SDN is disclosed. The network controller includes a processor and a memory, said memory containing instructions executable by the processor where the network controller is operative to cause the NE to update a first subset of forwarding table entries from a set of one or more forwarding table entries to include a post-synchronization indicator. The network controller is also operative to cause the NE to delete, following the update of the first subset of forwarding table entries, a second subset of zero or more forwarding table entries from the set of forwarding table entries, where each forwarding table entry from the second subset includes a pre-synchronization indicator.

A non-transitory computer-readable storage medium having instructions stored therein is disclosed. The instructions, when executed by a processor of a network controller of a control plane in a software defined network (SDN) coupled to a network elements (NE) of a data plane in the SDN, cause the processor to perform operations including: causing the NE to update a first subset of forwarding table entries from a set of one or more forwarding table entries to include a post-synchronization indicator; and causing the NE to delete, following the update of the first subset of forwarding table entries, a second subset of zero or more forwarding table entries from the set of forwarding table entries, where each forwarding table entry from the second subset includes a pre-synchronization indicator.

Embodiments of the invention aim at improving the resynchronization of forwarding states of a network device in a software defined network (SDN) following a connectivity disruption between the network device and the network controller of the SDN. The resynchronization being performed through the update of flow/group table entries with a post-synchronization indicator (flow cookie, flow cookie mask, and/or group property) and the deletion of flow/group table entries based on a pre-synchronization indicator (flow cookie, flow cookie mask, and/or group property) associated with these flows/groups. The resynchronization is more efficient, and occurs without any disturbing the processing of packets within the network device.

BRIEF DESCRIPTION OF THE DRAWINGS

The invention may best be understood by referring to the following description and accompanying drawings that are used to illustrate embodiments of the invention. In the drawings:

FIG. 1 illustrates a method and system 100 for resynchronization of forwarding states of a network forwarding device in accordance with some embodiments of the invention.

FIG. 2A is a flow diagram illustrating detail operations for causing the network element to update a first subset of forwarding table entries from the set of one or more forwarding table entries to include a post-synchronization indicator in accordance with some embodiments of the invention of the invention.

FIG. 2B is a flow diagram illustrating detail operations for causing the network element to delete a second subset of forwarding table entries from the set of forwarding table entries in accordance with some embodiments of the invention.

FIG. 3A illustrates a flow diagram of operations performed in a network element following the receipt of a message from a network controller to update a first subset of forwarding table entries to include a post-synchronization indicator in accordance with some embodiments of the invention.

FIG. 3B illustrates a flow diagram of operations performed at a network element upon receipt of a message from a network controller to delete forwarding table entries based on a pre-synchronization indicator in accordance with some embodiments.

FIG. 4 illustrates an exemplary structure for modifying a synchronization indicator to be sent in a message to a network element according to some embodiments.

FIG. 5A illustrates an exemplary structure for defining a property type of a group to be sent in a message to a network element according to some embodiments of the invention.

FIG. 5B illustrates an exemplary structure for modifying/removing a property value of a group to be sent in a message to a network element in accordance with some embodiments of the invention.

FIG. 5C illustrates an exemplary set of commands used to perform operations on properties of a group to be sent in a message to a network element in accordance with some embodiments of the invention.

FIG. 5D illustrates an exemplary structure for deleting a group based on based on a property value of the group to be sent in a message to a network element in accordance with some embodiments of the invention.

FIG. 7C illustrates various exemplary ways in which virtual network elements (VNEs) may be coupled according to some embodiments of the invention.

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs implements a single NE, but a centralized control plane has abstracted multiple of the NEs in different NDs into (to represent) a single NE in one of the virtual network(s), according to some embodiments of the invention.

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 6:
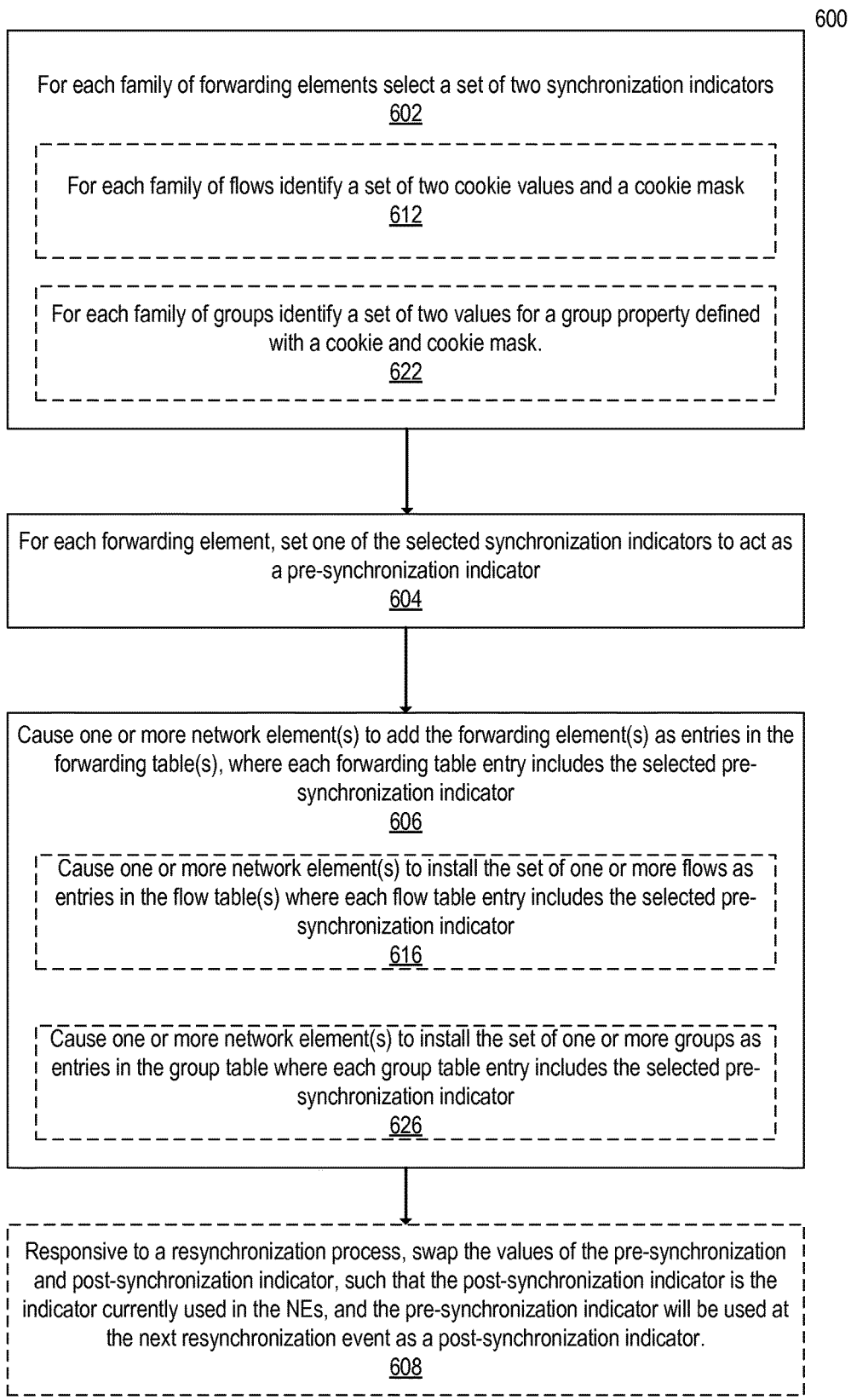
FIG. 6 illustrates a flow diagram of operations performed in a network controller for initialization of a SDN network with a set of synchronization indicators for each family of forwarding elements in accordance with some embodiments of the invention.

The following description describes methods and apparatus for resynchronization of forwarding states in a network forwarding device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview:

In a Software-Defined Network (SDN), the control plane is implemented as a layer separate than the data plane layer. In some embodiments, the control plane is implemented in a network device which may be physically separate from the one or more devices including the forwarding network elements of the data plane.

A network controller can act as a centralized control-plane for thousands of independent forwarding network elements. In some embodiments, the network controller is deployed as a multi-node cluster of servers (or network devices). In other embodiments, the network controller is deployed on a single sever (i.e. network device). The network controller will maintain a control connection (e.g. through the use of a control protocol such as OpenFlow) with each one of the forwarding network elements. In such a deployment scenario, there may be disruption in the connectivity between the network controller and one or more forwarding network elements due to various reasons such as the restart of the network controller, a reboot or restart of one of the network forwarding elements, network problems in the network controller, an application running on the network controller restarting etc. These interruptions or disruptions of the connectivity between the network controller and one or more forwarding network elements may result in a need to resynchronize the forwarding states (forwarding table information) of the forwarding network elements with the network controller's states.

For example, the network controller may need to verify that only currently handled flows or groups of flows are processed at the forwarding network elements, and any stale or out of date flows/groups are removed from the forwarding tables of the forwarding network element. In particular, the network controller needs to ensure that the forwarding network elements of the data plane affected by the connection disruption are configured with appropriate forwarding states upon recovery from the disconnection while ensuring that the processing of packet data traffic in the data-plane is not impacted during the resynchronization process. The network controller needs to further ensure that any flow/group table entries that are no longer needed (i.e., flows/groups that are no longer processed in the network element affected by the disconnection) are removed.

Various Approaches to forwarding states resynchronization:

Different approaches may be used to resynchronize forwarding states of a network following the disconnection or disruption of connectivity of the network controller with one or more forwarding network elements.

In a first approach, the network controller (NC) may query from the forwarding network element (NE) its existing forwarding states based on statistics queries performed on the specific forwarding element. Then, the network controller performs comparisons of the NE's forwarding states with the NC's forwarding states to identify a set of flows or a set of groups of flows that needs to be resent to the forwarding network element. This first approach has a limitation of requiring the network controller to maintain a snapshot of its current forwarding states to perform the comparison. This requires the implementation of extra states in the network controller to enable the resynchronization of the network elements. Further this requires a lot of bandwidth to get all the statistics and reinstalling flows on the NE.

In a second approach, the network controller sends all the flows it comprises to be reconfigured in the forwarding tables of the disrupted forwarding network element(s). This approach has also the limitation of when a flow is reconfigured, the OpenFlow agent state is first updated on the forwarding network element. The OpenFlow Agent maintains the record of flow and group details and pushes them to the line-card(s) and/or forwarding function(s), which process the live packets (i.e., incoming packets of the NE).This step involves removing the existing rule and reinstalling the rule again in the forwarding table(s) for each flow which can disrupt the processing of packets in the forwarding network element for up to few milliseconds resulting in a delay, causing processing time problems in high traffic conditions. In addition another limitation of the second approach is that after the control element reinstalls (replays) all the network states, the forwarding network element may not know if there are any stale states remaining in its forwarding table(s) which may need to be cleaned up and removed. This will result in the waste of memory real estate and increase of processing time.

In a third approach, the network controller may send a resynchronization initialization request to the disrupted forwarding network element(s). Upon receipt of the request, the forwarding network element sends a reply. Following the resynchronization initialization sequence (i.e., request-reply), the forwarding network element marks all its existing forwarding table entries as stale. The network controller then resends all of its forwarding states (current forwarding table entries) to the forwarding network elements. As the forwarding states are received at the forwarding network element, the FNE will remove the stale marking on the received flows without performing an update on the line-card/forwarding function. After sending all the states (flows/groups), the network controller sends a resync-complete request to the forwarding network element (FNE). Upon receipt of the resynchronization-complete request the FNE removes all entries from the forwarding tables that are still marked as stale. Finally a resynchronization-complete reply is sent to the network controller. This approach involves a long sequence of operations and additional implementation challenges on the forwarding network elements of the data plane to stale mark/unmark forwarding table entries. Further this approach increases the amount of processing that needs to be performed at the network element. In particular, all forwarding table entries needs to be stale marked, all forwarding table entries needs to be checked upon receipt of forwarding states of the network controller in order to be unmark if applicable, and further the remaining forwarding table entries needs to be removed if their status remain stale.

Further none of the approaches described above provide an efficient mechanism for resynchronizing the forwarding states of a network element following the disconnection of the network element with its network controller. In addition none of these approaches allow for selective update of forwarding table entries (e.g. a family of flows specific to an application or groups of flows specific to an application).

Thus a network forwarding state resynchronization technique and system have been developed which overcome the limitations and shortcomings of the prior approaches. The techniques described below can be used in an OpenFlow based SDN. The proposed techniques and network elements use synchronization indicators identified at least in part by a value of a flow cookie field for flow entries and a value of a group property for group entries to resynchronize forwarding states of a forwarding network element following a disconnection of the network element with a network controller.

According to some embodiments of the invention, one method of resynchronizing forwarding states of a network element with forwarding states of a network controller includes updating one or more forwarding table entries of the network element following the detection of a resynchronization event to include a new synchronization indicator and the deletion of forwarding table entries that are not updated based on a synchronization indicator which is different from the new synchronization indicator. In embodiments of the invention, each of a first subset of forwarding table entries from a set of one or more forwarding table entries is updated to include a post-synchronization indicator. Following the update of the first subset of forwarding table entries, a second subset of zero or more forwarding table entries from the set of forwarding table entries is deleted, wherein each forwarding table entry from the second subset includes a pre-synchronization indicator. The pre-synchronization indicator being different from the post-synchronization indicator. Various embodiments of methods and systems for resynchronization of forwarding states of a network element will be described with further detail below.

FIG. 1 illustrates a method and system 100 for resynchronization of forwarding states of a network forwarding device in accordance with some embodiments. In FIG. 1, the circled numbers are used to denote transactions performed by the elements in the system. The order/sequence of the transactions in FIG. 1 is shown for illustrative purposes, and is not intended to be limitations of the present invention.

System 100 includes a software-defined network (SDN) represented by network controller (NC) 110 and network element (NE) 130 (which may also be referred herein as a forwarding network element). Although the SDN may include additional NEs controlled by the NC, they are not shown here for ease of understanding. Thus when the description below refers to NE 130, one can assume that the description may also be referring to additional NEs in the SDN that are controlled by NC 110.

In the illustrated embodiment, the network controller 110 acts as the control plane and the NEs, including NE 130, act as the data plane. The control plane in the SDN communicates with the network elements of the data plane using an SDN communications protocol (e.g., OpenFlow; defined by the Open Networking Foundation). The network controller may be implemented on one or more network devices, and each of the NEs may be implemented on one or more network devices. The structure of the SDN is described in further details in reference to FIGS. 7A-D, and 8.

A SDN network provides a network administrator with a centrally managed control plane (e.g., the network controller 110) and may simplify management and reduce costs. Unlike a traditional network device where the control plane and data plane reside on one device, separating the control plane and data plane means that the control plane and data plane devices are now communicatively coupled using a link, such as link 150. This may introduce additional latencies, bandwidth limitations, and disconnection/connection limitations.

In the event of a disconnection between the network controller 110 and NE 130 a resynchronization of the forwarding states needs to occur to ensure that the forwarding states (i.e. the flows table entries and the group table entries) of the network controller are in accordance with the forwarding states of the network element. For example, upon occurrence of a disconnection between the network controller 110 and the network element 130, the respective states of each network element (NC and NE) may be out of sync (i.e., desynchronized) for various reasons:

1. OpenFlow flow and group requests are one-way requests sent in an unsolicited manner without expecting a response. In case a flow/group installation fails in the forwarding network element, a notification is sent to the controller. Therefore if the controller gets disconnected before the notification is received, the forwarding states of the network controller and the forwarding network element can go out of sync.

2. As the connection between the controller and the NE gets disrupted, there is a small window of opportunity where the request sent by the network controller was not received by the network element. Since the request is one way request it can happen that the controller may assume successful installation of the request on the network element. Similarly even the messages sent from the network element towards the controller in the form of notifications can get lost for the same reason.

3. Flows on the network element can expire even when they are in a fail-over mode (no connectivity between the network controller and the network element).

In a scaled scenario where lot of messages are being exchanged between the network controller and the network element, chances for a de-synchronization of the forwarding states increase. The reasons causing a de-synchronization of the network controller's states and the network element's states provided above are exemplary only and are not intended to be limited to the examples presented herein. Other reasons may cause the respective states of each network element (NC and NE) to be out of sync. Thus, there is a need to update the states of the network element ensuring that they are the same as the states at the network controller 110. During the resynchronization of the forwarding states, the processing of data packets in the NE 130 is not to be disrupted, and the stale flow/group table entries which are not needed should be removed from the forwarding tables of the network element 130.

At circle 1, the network controller 110 detects (block 111) a resynchronization event. The resynchronization event may be due to a restart of network controller 110, to a restart of network element 130, a restart or disconnection of an application coupled with the network controller, or alternatively to a disruption in the connection between network controller 110 and network element 130. In some embodiments, network controller 110 may detect that the connection with NE 130 has been disconnected or that an error occurred in the network including the NC 110 and the NE 130 which results in the initiation of a resynchronization process to resynchronize the forwarding states of the NE 130 with the forwarding states of the NC 110.

The forwarding states included in the forwarding network element (NE) 130 are forwarding table entries of forwarding tables of the NE 130. In some embodiments, the forwarding table entries are flow table entries which are associated with flows related to traffic processed and forwarded by the network element. The flow table entries are configured by the NC 110 at a configuration stage. The forwarding states of the NC represent the forwarding states that are currently requested to be processed within the network by the application layer. Thus upon disconnection of the connection between the NC and the NE, the states may be out of sync, as some applications may change the configuration of the control plane during the disconnection.

At circle 2, the NC 110 causes the network element 130 to update a first subset of forwarding table entries from a set of one or more forwarding table entries to include a post-synchronization indicator. In some embodiments, the set of one or more forwarding table entries is a set of entries in forwarding tables of the NE 130 associated with a family of flows or with a family of groups. In some embodiments, a family of flows are flows belonging to a single application. A family of flows is defined according to flow-rules that classify incoming packets according to a specific application. For instance, for a given set of subscribers, perform certain actions where each subscriber classification can be installed as an individual rule. Similarly a family of groups are groups defined by an application running on the application layer. A family of groups are group table entries created for a specific purpose (like send the packet out of the Network Element). The update of the first subset of forwarding table entries is sent to NE 130, at circle 3, in one or more messages 151 on link 150. In some embodiments, each message 151 includes a structure that includes a post-synchronization indicator to be used to update the first set of forwarding table entries. In some embodiments, the message may include an identification of the forwarding table entries to be updated (e.g., an identification of a flow family, an identification of a flow, an identification of a group family, or an identification of a group). Examples of such a structure(s) for the message(s) 151 sent at circle 3 will be described in detail with reference to FIG. 4 and FIG. 5B.

At circle 4, the message 151 from NC 110 causes NE 130 to update a first subset of forwarding table entries 141 to include the post-synchronization indicator. Note that although only one NE 130 is shown here, NC 110 may simultaneously send multiple messages like message 151 to multiple NEs 130. Each one of the NEs 130 may have a different set of forwarding table entries in its forwarding table(s). The message sent to each one of the NEs 130 may include a different post-synchronization indicator associated with the set of forwarding table entries of that NE.

In some embodiments, when updating a forwarding table entry, the NE 130 may first determine whether the forwarding table entry is present in one of the forwarding table(s) 140 of the NE prior to updating the entry. After determining that the forwarding table entry is present, the NE 130 updates a portion of the existing forwarding table entry (e.g., update a cookie of a flow table entry, or a property identified by a cookie value of a group table entry). In these embodiments, contrary to prior art approaches, the update of the forwarding table entry occurs without removing and reinserting the forwarding table entry. At the contrary only a portion of the forwarding table entry is updated without disturbing the processing of packets receiving in the NE 130 (e.g., packets being processed in line cards of the NEs, or in packet forwarding threads of the NEs). The update of the forwarding table entry is not pushed to the forwarding module of the NE 130 (i.e. it's line cards/packet forwarding threads). Alternatively, after determining that the forwarding table entry is not present in one of the forwarding table(s) 140, the NE 130 inserts a new forwarding table entry including the post-synchronization indicator. In some of the embodiments presented herein a forwarding table entry (flow table entry or group table entry) may only be added to a forwarding table (flow table/group table) if the flow/group entry is not already present in the table. Modifications to flow-instructions or group-buckets will not be done as part of these requests.

At circle 5, the network controller 110 causes the NEs 130 to delete, following the update of the first subset of forwarding table entries, a second subset of zero or more forwarding table entries from the set of forwarding table entries, where each forwarding table entry from the second subset includes a pre-synchronization indicator. In some embodiments after the update of the first subset of forwarding table entries is confirmed from the NE 130, the NC 110 sends a message to the NE to delete forwarding table entries which include a pre-synchronization indicator. The post-synchronization indicator and the pre-synchronization indicators are associated with the set of forwarding table entries (which include the first subset of forwarding table entries and the second subset of forwarding table entries). The post-synchronization indicator is different from the pre-synchronization indicator.

The set of forwarding table entries 143 is included in one or more forwarding tables of the NE 130. In one embodiment, the first subset of forwarding table entries updated with the post-synchronization indicator represent all forwarding table entries that the NE needs to keep active after the disruption of connection occurs between the NC 110 and NE 130, while the second subset of forwarding table entries includes the entries that do not need to be active in the NE and should be removed from the forwarding tables. In these embodiments, prior the disruption of the connectivity between the NE and NC, the set of forwarding table entries is stored in the forwarding table entries and each of these entries has a pre-synchronization indicator included in the entry (e.g., the cookie of each flow table entry equals a pre-synchronization value). Thus when the NC causes the update of the first subset of forwarding table entries, these forwarding table entries are updated to include a new synchronization indicator (i.e., the post-synchronization indicator) which is different from the pre-synchronization indicator (which was already included in the set of forwarding table entries prior the update). In some embodiments at least one entry in the forwarding table entries is not updated and therefore this entry will include the pre-synchronization indicator. The NC 110 at circle 5, causes this entry to be deleted from the table. In other embodiments, all entries are updated with the post-synchronization indicator. In this embodiment, upon receipt of a request to delete forwarding table entries with a pre-synchronization indicator, NE 130 does not delete any entry since there are no entries with the pre-synchronization indicator in the forwarding tables.

The deletion of the second subset of forwarding table entries is sent to NE 130, at circle 6, in one or more messages 152 on link 150. In some embodiments, each message 152 includes a structure that includes a pre-synchronization indicator to be used in determining the second set of forwarding table entries to be deleted. According to these embodiments, the forwarding table entries to be deleted are thus identified with the pre-synchronization indicator. Examples of such a structure(s) for the message(s) 152 sent at circle 6 will be described in detail at least with reference to FIG. 5D. Other embodiment will be described below.

At circle 7, the message 152 from NC 110 causes NE 130 to delete the second subset of forwarding table entries 142 from one or more of the forwarding table(s) 140. Note that although only one NE 130 is shown here, NC 110 may simultaneously send multiple messages like message 152 to multiple NEs 130. Each one of the NEs 130 may have a different set of forwarding table entries in its forwarding table(s). The message sent to each one of the NEs 130 may include a different pre-synchronization indicator for identifying forwarding table entries to delete. The NE 130 retrieves then the pre-synchronization indicator from the message 152 and deletes (block 134) all forwarding table entries that include the pre-synchronization indicator. In some embodiments, these entries are all the entries that were not updated with the post-synchronization indicator, i.e., they are the entries present in the forwarding table before the occurrence of the disconnection with the NC. However these entries are not needed anymore as the flows and groups of these entries are not processed in the NE anymore.

The method and system for resynchronization of forwarding states of the network element, as described above and in the remaining portions of this description, has many unique advantages over prior art approaches.

One advantage is that the processing of traffic within the network element 130 is not interrupted or disrupted during the resynchronization process. In fact, since the forwarding table entries are only removed if there are no longer needed, and only a portion of each entry is updated (e.g., a flow cookie or a group property of the entry is updated), the incoming packets received at circle 8 are continuously processed by the NE without any disruption. At the contrary most of the prior art approaches require that the forwarding table entries be removed and then reinserted in order to be updated. The present invention provides the advantage of being able to modify the content of a forwarding table entry by modifying the cookie of a flow entry table without the need of removing and adding the associated flow table entry, which is performed in prior art approaches. Thus contrary to prior art approaches, the flow table entries are updated without disruption of the processing of traffic.

Another advantage is that the system and method described does not require major changes in the SDN.

Furthermore, although the traditional methods are not as efficient, since this improved system and method does not otherwise modify the SDN other than the changes described, this new improved method is still compatible with the traditional method in that both can co-exist in the same system without conflict. Thus, as described above and as will be described in further detail below, the embodiments of the invention for a method and system for resynchronization of forwarding states at the network element in a software defined network are a significant improvement over traditional systems and methods.

The operations in the flow diagrams will be described with reference to the exemplary embodiments of FIG. 1, FIG. 7A-F, and FIG. 8. However, it should be understood that the operations of the flow diagrams can be performed by embodiments of the invention other than those discussed with reference to FIG. 1, FIG. 7A-F, and FIG. 8, and the embodiments of the invention discussed with reference to these other figures can perform operations different than those discussed with reference to the flow diagrams.

FIG. 2A is a flow diagram illustrating in detail the operations of block 112 (circle 2) for causing the NE to update a first subset of forwarding table entries from the set of one or more forwarding table entries to include a post-synchronization indicator according to an embodiment of the invention. In some embodiments, the operations of block 112 are performed by NC 110.

At block 202, responsive to detecting a resynchronization event, the NC 110 identifies the first subset of forwarding table entries of the NE 130, which need to be updated with the post-synchronization indicator, based on its current forwarding table entries. Upon the occurrence of a disconnection between the NC 110 and the NE 130, and reestablishment of the connection, the NC 110 determines its current forwarding states (current forwarding table entries associated with flows and groups currently configured to be processed in the network by one or more application coupled with the NC 110). The NC 110 then determines which ones of these flows or groups of flows should be processed at the NE 130, thus determining the first subset of forwarding table entries to be updated. In some embodiments, these entries (of the first subset) may include all the flows managed by the NC 110 (i.e., may correspond to all the forwarding table entries of the NC 110). Alternatively in other embodiments, these entries of the first subset include only a portion of the forwarding table entries of the NC 110. For example, the first subset comprises some flows from a family of flows that are processed in the NE 130. In some embodiments, the forwarding table entries are identified by identifying the flows (e.g., determining a flow ID for each flow) to be updated and a set of one or more flow tables (e.g., determining a flow table ID) for each flow.

In one embodiment, the first subset of forwarding table entries identified by the NC 110 are flow table entries from a set of flow table entries. In this embodiment, the first subset may correspond to at least one flow table entry to be updated or to one or more flow table entries of the same family of flows. In this case, the set of one or more flow table entries is associated with a single family of flows, and the first subset is a portion or the entirety of the flow table entries associated with this family of flows.

In another embodiment, the first subset of forwarding table entries identified by the NC 110 are group table entries from a set of group table entries. In this embodiment, the first subset may correspond to at least one group table entry to be updated or to one or more group table entries of the same family of groups. In this case, the set of one or more group table entries is the family of groups, and the first subset is a portion or alternatively the entirety of the group table entries associated with this family of groups.

In an alternative embodiment, the NC 110 may identify a subset of flow table entries as well as a subset of group table entries to be updated. Even if the embodiments described above refer to a single family of flows/groups, the invention is not so limited. The NC 110 may process a high number of flows/groups and a high number of flow/group families which may need to be updated upon detection of a resynchronization event. The process described with respect to FIG. 2A and the update of forwarding table entries (flow table entries or group table entries) apply to the NC 110 while processing and handling thousands of flows/groups and corresponding flow/group families.

At block 204, the NC 110 identifies the post-synchronization indicator associated with the set of forwarding table entries. In some embodiments, the post-synchronization indicator is uniquely associated with the set of forwarding table entries comprising the identified subset of forwarding table entries. The post-synchronization indicator is indicative of a status of the forwarding table entries (i.e., the forwarding table entries updated with the post-synchronization are the forwarding table entries that should be processed in the network following the disconnection and reconnection of the NE and the NC). In one embodiment, the post-synchronization indicator is associated with a single family of forwarding table entries (a family of flows or a family of groups, and the family includes at least one group or flow). In other embodiments, the post-synchronization indicator is associated with all forwarding table entries to be updated by NC 110. In some embodiments, the post-synchronization indicator is selected along with a pre-synchronization indicator at an initialization stage for each family of flows/groups. In this embodiment, the post-synchronization indicator may be the pre-synchronization indicator used in the previous resynchronization occurrence.

In another embodiment, the post-synchronization indicator is selected at the time of the resynchronization process based on the pre-synchronization indicator of the NE 130. In one exemplary embodiment, the post-synchronization indicator is selected for each flow/group family to be different from the pre-synchronization parameter. For example if the value of the pre-synchronization is 2 bits of a defined value (e.g., 00), the post-synchronization indicator may be selected to be 2 bits of a different value (e.g., 01, 10, or 11). In this embodiment, NC 110 stores the value of the pre-synchronization indicator associated with each flow/group family of NE 130 and determines based on this value a new value for the post-synchronization indicator.

At block 206, when the set of forwarding table entries is a set of flow table entries associated with a family of flows, NC 110 identifies the post-synchronization indicator and pre-synchronization indicator at least in part by a pair of cookie values associated with the family of flows. The cookie field is an opaque identifier added to each flow. In traditional systems and according to OpenFlow specification, the cookie is specified by the network controller when the flow is installed; the cookie will be returned as part of each flow stats and flow expired message. The cookie may be used by the network controller to filter flow entries affected by flow statistics, flow modification and flow deletion requests. The cookie is not used when processing packets in the NE 130. In other embodiments, in addition to a pair of cookie values, the post-synchronization and pre-synchronization indicators are identified with a cookie mask associated with the pair of cookie values. The cookie mask specifies which bits of the cookie field should be used for the post-synchronization indicator. For example if the cookie field is 64 bits, for each family of flows/groups, the network controller may set a different number of bits from the 64 bits to define the cookie value and match the flow table entries. The cookie mask may specify 1, 2, or N bits (where 1=<N=<64) of the cookie of each flow that should be matched. Thus, in some embodiments, the post-synchronization indicator is a value of a cookie field and a value for the cookie mask field uniquely selected for each flow family. In other embodiments, the post-synchronization indicator is a value of a cookie field and a value for the cookie mask field uniquely selected for all flows to be updated or for one or more flow families.

Thus, at block 206, NC 110 identifies the cookie value and cookie mask associated with the family of flows associated with the set of flow table entries. In some embodiment, the cookie value and cookie mask values were selected at an initialization stage (e.g., when the flow or the family of flows were installed). Alternatively, the cookie value and cookie mask can be selected at the time of the resynchronization process to be different from the current cookie value and cookie mask value present in NE 130 for the flows or family of flows.

At block 208, when the set of forwarding table entries is a set of group table entries associated with a family of groups, identify the post synchronization indicator and pre-synchronization indicator at least in part using a group property. For each group entry or family of groups, NC 110 defines a property of type cookie and cookie mask. FIG. 5A illustrates an exemplary structure 500A for defining a property type of a group to be sent in a message to a network element according to some embodiments of the invention. FIG. 5A provides an exemplary definition (500A) of cookie/cookie mask property type definition. Lines 512 and 514 illustrate the definition of a property of type cookie and cookie mask. In other words, each group will be associated with this newly defined property (cookie, cookie mask). In the non-limiting example of FIG. 5A, the property type is defined to include two parameters a first parameter 512 "a_property_type_cookie=100" and a second parameter "a_property_type_cookie_mask=101". While the property types (cookie and cookie_mask) are defined to be respectively "100" and "101" one would understand that any other pair of values may be used to identify the type of each property. In some embodiments, a post-synchronization value and a pre-synchronization value are set for each group or family of groups by the choice of a pair of group properties associated for that group or family of groups (i.e., for each group/family a post-synchronization property value (e.g., cookie_post and cookie_mask_post) and a pre-synchronization property value (e.g., cookie_pre and cookie_mask_pre) are chosen). In other embodiments, the post-synchronization value can be selected at the time of the resynchronization process to be different from the current property value (cookie_pre, cookie_mask_pre values) present in NE 130 for the group or family of groups. Once the forwarding table entries are identified and the post-synchronization indicator is identified for the forwarding table entries, flow moves to block 210.

At block 210, NC 110 sends a message 151 to the NE 130 to update the first subset of forwarding table entries to include the post-synchronization indicator. In embodiments, the message 151 sent to the NE 130 indicates the value to use to update only a portion (e.g., a field, a set of bits) of each forwarding table entry from the first subset of forwarding table entries in NE 130. The transmission of the message may be performed according to block 212, or 214 or alternatively a first message as described with respect to block 212 is sent and another message as described with reference to block 214 is sent by NC 110. While embodiments of the invention are described in relation to the transmission of a single message, more messages may be sent to the NE 130 to update forwarding table entries. In an exemplary embodiment, a message is sent for each family of flows/groups which needs to be updated at NE 130. In other embodiments, a message may be sent for each flow/group which needs to be updated at the NE 130.

In one embodiment, at block 212, NC 110 sends a message to the NE to update the first subset of one or more flow table entries associated with a family of flows to include a cookie value associated the family of flows, where the cookie value (which is referred herein as a post-synchronization cookie) is a post-synchronization indicator. In some embodiments, in addition to including a post-synchronization cookie, the message include a post-synchronization cookie mask value.

In some embodiments, the message sent is defined according to a structure as illustrated in FIG. 4. Traditional systems do not allow the update of a cookie/cookie mask of a flow/family following the installation of the flows. The present invention provides for a method and system which allows for the update of a cookie/cookie mask pair of a flow or a family of flows at any time without disturbing the forwarding instruction for those flows. The structure 400 of FIG. 4, illustrates the structure of a message sent from NC 110 to NE 130 to update the cookie/cookie mask of a flow or a family of flows. This message will impact the OpenFlow agent only on the NE 130 and will not impact the forwarding module of NE 130 (which processes the incoming packets (circle 8 of FIG. 1) into outgoing packets (circle 9 of FIG. 1) (the forwarding module being line cards and/or packet forwarding threads)). Upon receipt of this command, NE 130 will update the cookie and cookie mask field in the matching flow entries with the supplied values from this command (i.e., value 418 and 420). The Forwarding function(packet forwarding threads)/Line Card states will not be updated thus resulting in an update of the forwarding table entries without disturbing the processing of incoming packets (circle 8) and the outgoing packets (circle 9) in NE 130. The present method provides a new structure to modify the cookie and the cookie mask value of a flow/family of flows even after the installation of the flow in the NE 130. In particular the modification of the cookie field and/or the cookie mask field with a value corresponding to the post-synchronization indicator occurs during the resynchronization of the forwarding states of the network controller and the network element 130. In some embodiments the structure 400 includes additional information/parameters that will be sent in the message (e.g., "unint8_t table_id" 422 for indicating the identification of the table to put the flow in.; "unint16_t idle_timeout" 424 which indicate an idle time before discarding (in seconds); "unint16_t hard_timeout" 426 which indicates a max time before discarding (in seconds); "unint16_t priority" 428 which indicates the priority of the flow entry; "unint16_t flags" which indicates a bitmap of OFPFF_* flags; "struct ofp_match match" which indicates the fields to match (which is of variable size); and "struct ofp_instruction_header instructions[0]" which indicates an instruction set zero or more, for which the length set is inferred from the length field in the header). In some embodiments, idle/hard timeout, priority, flags and instructions fields will be used only in case the flow doesn't exist in the flow table(s) and needs to be added to the flow table(s).

In another embodiment, at block 214 NC 110, sends a message to the NE to update the first subset of one or more group table entries associated with a family of groups to update a property of the group with a post-synchronization value associated with the family of groups. In some embodiments, the message sent to NE 130 can be used to update a group cookie/cookie_mask experimenter properties as described with respect to FIG. 5A. In one embodiment, the property types of cookie and cookie-mask specified above (with reference to FIG. 5A) can be inserted into the group properties using an existing OpenFlow command at the time of installation of the group (e.g., "ofp_group_mod command"). However in order to update the group property of a group/family of groups at another moment (following the initial installation of a group or family of groups) the invention introduces the structure 500B illustrated in FIG. 5B.

FIG. 5B illustrates an exemplary structure for modifying (e.g., updating, removing, adding) a property value of a group to be sent in a message to a network element in accordance with some embodiments of the invention. This structure may be used by NC 110 to send a message to update/remove or add a property value to a group. The update may be performed at any time in the network, in particular during the operations of block 214 of the resynchronization mechanism. Thus NC 110 sends a message with structure 500B to execute a command 522 (e.g., update, add, or remove) on the property (520) of a group or family of groups (identified with group_id 524). In some embodiments, the message may include additional parameters (e.g., "uint16_t bucket_array_len" 526 which indicates the length in bytes of the bucket "ofp_bucket bucket[0]" 528). The "bucket_array_len" 526 and buckets 528 will be used when the group doesn't exist in a group table and needs to be added.

FIG. 5C illustrates an exemplary set of commands used to perform operations on properties of a group to be sent in a message to a network element in accordance with some embodiments of the invention. Upon receipt of a message including "a_group_property_command" the NE 130 will update the group properties appropriately. FIG. 5C illustrates a first command 532 for adding a new property; a second command 534 for removing an existing property; and a third command 536 for modifying a given property value. The command 536 may be used to update a property of a group table entry with the appropriate post-synchronization value during a resynchronization process of the forwarding states of the NE. These operations are performed at the OpenFlow agent only (i.e., there will be no update on the line-card/forwarding function entities). In some embodiments, any error and exception (e.g., such as trying to add an already existing property, trying to modify/delete a non-existing property) will result in a corresponding OpenFlow error (e.g., OFPT_ERRORs).

FIG. 3A illustrates a flow diagram of operations performed in the network element 130 following the receipt of a message from the NE 110 to update the first subset of forwarding table entries to include the post-synchronization indicator. At block 132, upon receipt of a message 151 from NC 110, NE 130 retrieves from the message the identification of the forwarding elements to be updated in the forwarding tables 140 and the value of the post-synchronization to use for updating these flows. Accordingly only the bits corresponding to the synchronization indicator of the forwarding table entries are updated without disturbing the processing of data packets in the network element 130. In one embodiment, at block 316, the forwarding table entries are flow table entries and NE 130 updates a first subset of flow table entries. In another embodiment, at block 318, the forwarding table entries are group table entries and NE 130 updates the group table entries of the first set to include a post-synchronization value of a group property of type cookie and cookie mask upon receipt of a message from the network controller. In some embodiments, the operations of block 318 are performed in addition to the operations of block 318 following the receipt of more than one message from the network controller 110. For example, the NE 130 may receive a message to update one or more families of groups in addition to receiving a message for updating one or more families of flows. Thus the messages result in the update of one or more flow table entries in the flow table(s) and the update of one or more group table entries in the group table of the network element 130.

FIG. 2B illustrates a flow diagram of operations performed in a network controller for causing the deletion of a second set of zero or more forwarding table entries form the set of forwarding table entries. Following the update of the first subset of forwarding table entries with the post-synchronization indicator, the NC 110 identifies the pre-synchronization indicator associated with the set of forwarding table entries. In some embodiments, the pre-synchronization indicator is uniquely associated with the set of forwarding table entries comprising the second subset of forwarding table entries. The pre-synchronization indicator is indicative of a status of the forwarding table entries prior to the occurrence of the disruption or disconnection between the network controller 110 and the network element 130. In one embodiment, the pre-synchronization indicator is associated with a single family of forwarding table entries (a family of flows or a family of groups, and the family includes at least one group or flow). In other embodiments, the pre-synchronization indicator is associated with all forwarding table entries included in the NE 130 prior the disconnection with the network controller 110. In some embodiments, the pre-synchronization indicator is selected along with the post-synchronization indicator at an initialization stage for each family of flows/groups. The pre-synchronization indicator may be a value set up at the installation of each flow, alternatively the pre-synchronization indicator may be the value of the post-synchronization indicator used to update the forwarding table entries at the previous resynchronization process. In other words, once forwarding table entries are updated with a post-synchronization indicator, the network controller 110 stores this post-synchronization indicator as the pre-synchronization indicator of the next resynchronization event.

At block 218, when the set of forwarding table entries is a set of flow table entries associated with a family of flows, NC 110 identifies the pre-synchronization indicator at least in part by identifying a cookie value associated with the family of flows. In other embodiments, in addition to the cookie value, the pre-synchronization indicator is identified with a cookie mask associated with the cookie value. The cookie mask specifies which bits of the cookie field should be used for the pre-synchronization indicator. Thus, in some embodiments, the pre-synchronization indicator is a value of a cookie field and a value for the cookie mask field uniquely selected for each flow family. In other embodiments, the pre-synchronization indicator is a value of a cookie field and a value for the cookie mask field uniquely selected for all flows stored in the flow tables of NE 130 prior the resynchronization process. The pre-synchronization indicator may be the post-synchronization indicator used in the previous resynchronization occurrence.

At block 220, when the set of forwarding table entries is a set of group table entries associated with a family of groups, identify the pre-synchronization indicator at least in part using a group property. For each group entry or family of groups, NC 110 defines a property of type cookie and cookie mask. FIG. 5A provides an exemplary definition (500A) of cookie/cookie mask property type definition. Lines 512 and 514 illustrate the definition of a property of type cookie and cookie mask. In other words, each group will be associated with this newly defined property (cookie, cookie mask). In the non-limiting example of FIG. 5A, the property type is defined to include two parameters a first parameter 512 "a_property_type_cookie=100" and a second parameter "a_property_type_cookie_mask=101". In some embodiments, the pre-synchronization value is set for each group or family of groups by the choice of a group property value associated with that group or family of groups (i.e., for each group/family a pre-synchronization property value (e.g., cookie_pre and cookie_mask_pre) are chosen). The pre-synchronization indicator is the current property value (cookie_pre, cookie_mask_pre values) present in NE 130 for the group or family of groups before the update of the groups with the post-synchronization indicator.

In some embodiments the identification of the pre-synchronization indicator is performed simultaneously to the identification of the post-synchronization indicator (i.e., upon detection of a resynchronization event, NC 110 identifies for each family of groups/flows their corresponding set of post and pre-synchronization indicators). In these embodiments, for each family of groups/flows NC 110 identifies a synchronization indicator to use to update the flows that should remain the NE (post-synchronization indicator) and a synchronization indicator to use to filter and delete the flows that are no longer processed in the NE and should therefore be removed from the forwarding table entries of the NE.

Once the pre-synchronization indicator is identified for the forwarding table entries, flow moves to block 222. At block 222, NC 110 sends a message to the NE to delete forwarding table entries, where each forwarding table entry includes a pre-synchronization indicator. Upon receipt of the message, NE 130 deletes all forwarding table entries in the forwarding table(s) 140 which include the pre-synchronization indicator.

According to some embodiments, these forwarding table entries represents a portion of the set forwarding table entries 143 (i.e., the second subset of forwarding table entries 142). In one embodiment, at block 224, NC 110 sends a message to the NE 130 to delete flow table entries of a family of flows based on the pre-synchronization cookie value. In some embodiments, the message is an OpenFlow message requesting the deletion of flows with a cookie value matching the pre-synchronization cookie value identified at block 218 (e.g., the message may include a "ofpfc-delete" command). In these embodiments, the delete command can be filtered by cookie value, if the cookie_mask field contains a value other than 0. This constraint is that the bits specified by the cookie_mask in both the cookie field of the flow mod and a flow entry's cookie value must be equal. In other words, "(flow entry.cookie & flow mod.cookie mask)== (flow mod.cookie & flow mod.cookie mask)".

In other embodiments, at block 226, NC 110 sends a message to NE 130 to delete the group table entries of a family of groups based on a pre-synchronization value of a group property. In order to delete a group or family of groups based on the value of a property the invention introduces the structure 500D illustrated in FIG. 5D.

FIG. 5D illustrates an exemplary structure 500D for deleting a group based on based on a property value of the group to be sent in a message to a network element in accordance with some embodiments of the invention. This structure may be used by NC 110 to send a message to delete a group based on a property value. The properties values defined in FIG. 5A are used as parameters in the message.

FIG. 3B illustrates a flow diagram of operations performed at the network element 130 upon receipt of a message from the network controller to delete forwarding table entries based on the pre-synchronization indicator in accordance with some embodiments. At block 336, upon receipt of a message from the network controller, the NE deletes flows/groups or family of flows/groups based on the pre-synchronization indicator included in the message. At block 346 and 356.

While embodiments of the invention have been described in relation to a flow/family of flows being processed or alternatively a group/family of groups, alternative embodiments could be implemented such that the NC 110 and the NE 130 process flows and groups concurrently. For example, the operations of blocks 212-214 and blocks 206-208 may be performed in the NC 110.

FIG. 6 illustrates a flow diagram of operations performed in a network controller 110 for initialization of a SDN network with a set of synchronization indicators for each family of forwarding elements in accordance with one embodiment of the invention. At block 602, a set of two synchronization indicators is selected for each family of forwarding elements (i.e., a flow or a group). For example, an application can install a "set of flows & groups" (i.e., a family of flows/groups) for a specific purpose and they can be assigned the same pre/post synchronization indicator so that it is possible to synchronize the flow & group families separately. Further each application can define multiple flow/group families.

At block 612, the NC 110 identifies for each family of flows (where a family includes one or more flows (e.g., a family of flows installed by a single application)) a set of two cookie values and a cookie mask to use during the resynchronization process. At block 622, the NC 110 identifies for each family of groups (where a family of groups is one or more flows) a set of two values for a group property defined with a cookie and cookie mask for use during the synchronization process. In some embodiments, the operations described at block 612 and block 622 are performed consequently one after the other for each family of flows/groups. In alternative embodiments, block 612 or block 622 are performed without the operations of the other block.

At block 604, for each forwarding element (i.e., a flow/group or a family of flows/groups) NC 110 sets one of the selected synchronization indicators to act as a pre-synchronization indicator.

At block 606, NC 110 causes one or more network element(s) 130 to add the forwarding element(s) as entries in the forwarding table(s) 140, where each forwarding table entry includes the selected pre-synchronization indicator. In one embodiment, the operations of blocks 602, 604 and 606 are performed at an initialization stage at which the flows and groups are installed in the forwarding table(s) of the network element(s) 130. At block 616, NC 110 causes NE 130 to install a set of one or more flows as entries in the flow table(s) where each flow table entry includes the selected pre-synchronization indicator. At block 626 NC 110 cause one or more network element(s) 130 to install a set of one or more groups as entries in the group table where each group table entry includes the selected pre-synchronization indicator.

At block 608 responsive to a resynchronization process, swap the values of the pre-synchronization and post-synchronization indicator, such that the post-synchronization indicator is the indicator currently used in the NEs, and the pre-synchronization indicator will be used at the next resynchronization event as a post-synchronization indicator to update flows/groups.

The method and system for resynchronization of forwarding states of the network element, as described above The method and system for resynchronization of forwarding states of the network element, as described above and in the remaining portions of this description, has many unique advantages over prior art approaches.

One advantage is that the processing of traffic within the network element 130 is not interrupted or disrupted during the resynchronization process. In fact, since the forwarding table entries are only removed if there are no longer needed, and only a portion of each entry is updated (e.g., a flow cookie or a group property of the entry is updated), the incoming packets received at circle 8 are continuously processed by the NE without any disruption. At the contrary most of the prior art approaches require that the forwarding table entries be removed and then reinserted in order to be updated. The present invention provides the advantage of being able to modify the content of a forwarding table entry by modifying the cookie of a flow entry table without the need of removing and adding the associated flow table entry, which is performed in prior art approaches. Thus contrary to prior art approaches, the flow table entries are updated without disruption of the processing of traffic.

Another advantage is that the system and method described does not require major changes in the SDN.

Another advantage is the possibility of performing resynchronization of a specific set of flow (e.g., all flows belonging to a specific application, a subset of flows belonging to a specific application). For example, parental control applications can be used to block certain websites on devices used by a child. The child's device can be identified based on the incoming port, IP-address, VxLan VNI etc., while the website can be identified by using the destination IP prefix of the packet. Thus an applications can add specific flows that identify kids and resynchronization of these flows can be performed with a single pre/post synchronization pair associated with this family of flows. There may be different family of flows for different kid devices used in that network). In another non-limiting example, an application that provides increased bandwidth on demand to some users can install specific flows/groups for a defined time period with higher priority for those users. In the event of connection disruption, this application can resynchronize the flows associated with each high priority user (which belong to the same family of flows) by identifying the specific flows/groups using the pre/post synchronization indicators associated with this family of flows/groups. Further, state changes in the form of cookie updates sent to the network element involve changes to the OpenFlow agent only while the forwarding plane (e.g., line cards, forwarding functions/threads) is not impacted by the resynchronization procedure. In addition contrary to some of the traditional approaches, there is no need to send resynchronization initiation and completion messages. There is no need for a stale marking of flows/groups in the forwarding network element. The operations of the present invention provide a need for a simple resynchronization logic required on the network controller. The methods and systems described above can be implemented without any change to the OpenFlow Specifications.

The operations of the flow diagrams and systems described with respect to FIGS. 1-6 may be implemented with network devices and network systems as described in more detail below with reference to FIGS. 7A-8.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figures 7A, 7B:
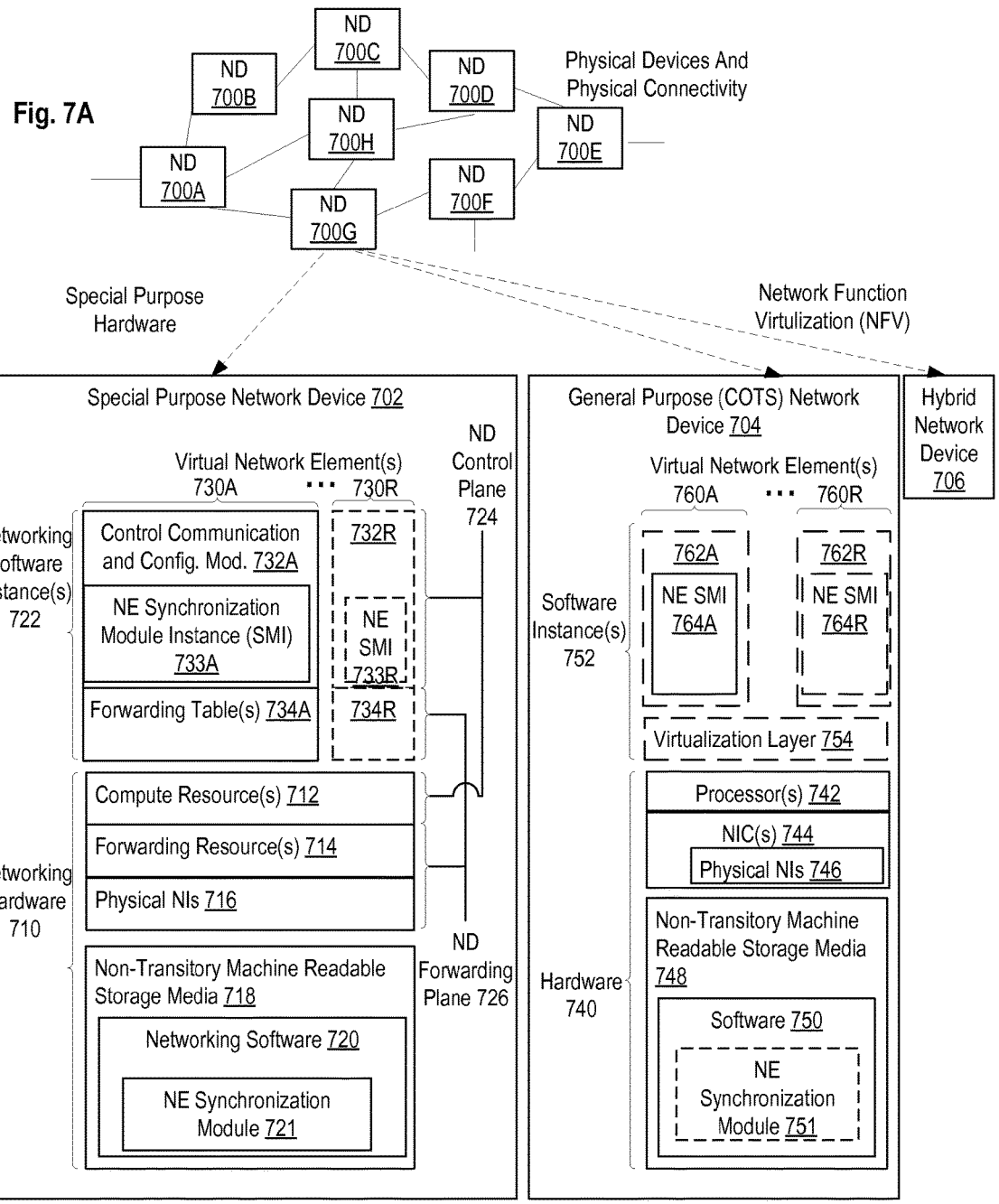
FIG. 7A illustrates connectivity between network devices (NDs) within an exemplary network, as well as three exemplary implementations of the NDs, according to some embodiments of the invention.
FIG. 7B illustrates an exemplary way to implement a special-purpose network device according to some embodiments of the invention.
Figure 8:
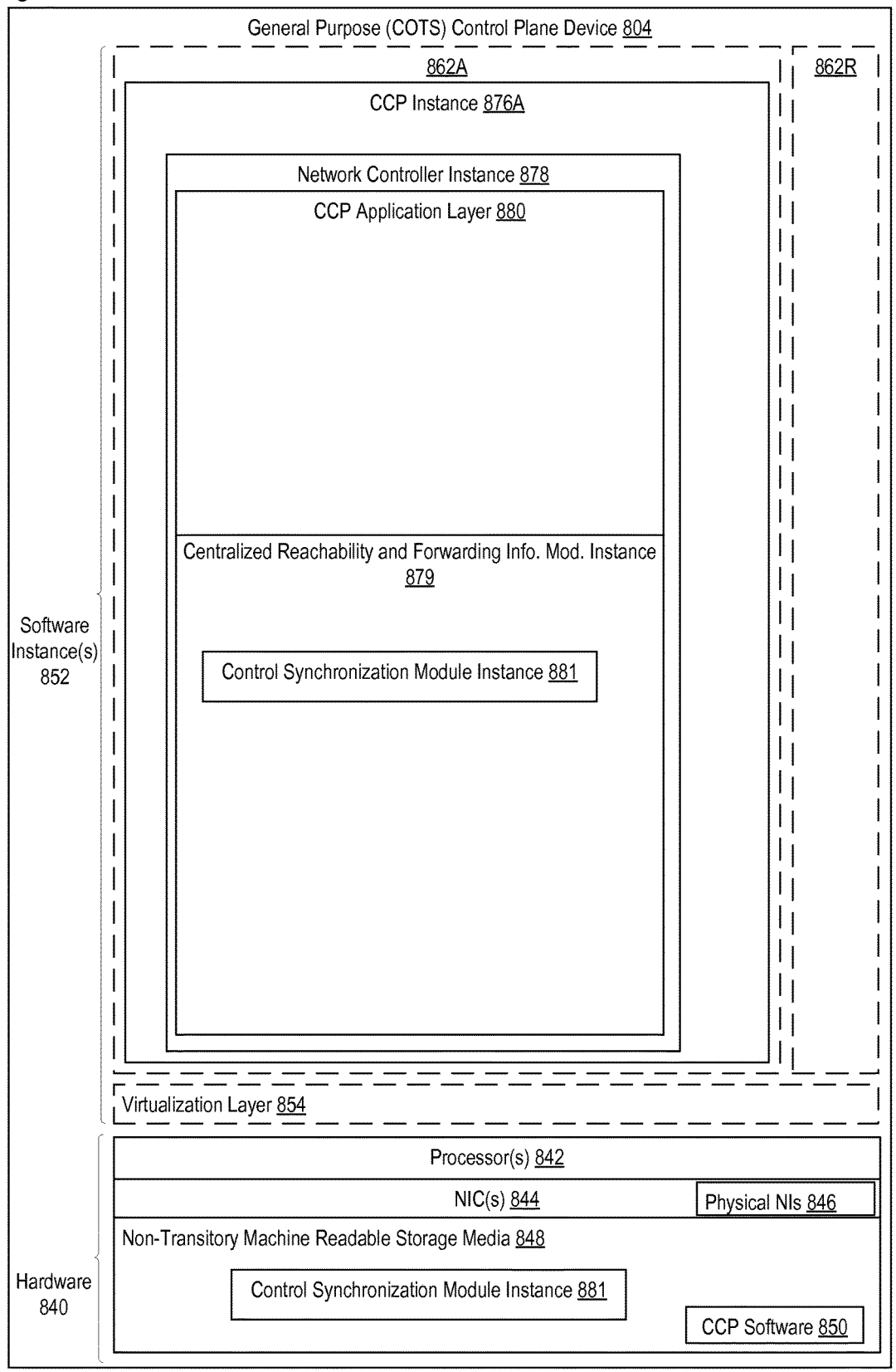
FIG. 8 illustrates a general purpose control plane device with centralized control plane (CCP) software 850), according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. During operation, NE synchronization module NE SN 721 may be executed by the networking hardware 710 to instantiate a NE Synchronization Module Instance (SMI) 733A, which performs methods as discussed herein above in relation to FIGS. 1-6. VI 733A and that part of the networking hardware 710 that executes that instance (be it hardware dedicated to that networking software instance and/or time slices of hardware temporally shared by that networking software instance with others of the SM instance 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 (which includes the NE synchronization module 751 and performs methods as discussed herein above in relation to FIGS. 1-6.) to instantiate one or more sets of one or more applications 764A-R (which includes applications NE SMI 764A-R and perform methods as discussed herein above in relation to FIGS. 1-6). While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, nonvirtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software containers 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. The centralized reachability and forwarding information module 579 contains a Control Synchronization Module (CSM) 781 which performs operations related to FIGS. 1-6. CSM 781 causes the NEs (e.g., 770D and 770E) to update a first subset of forwarding table entries from a set of one or more forwarding table entries to include a post-synchronization indicator; and to delete, following the update of the first subset of forwarding table entries, a second subset of zero or more forwarding table entries from the set of forwarding table entries, where each forwarding table entry from the second subset includes a pre-synchronization indicator.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 776, and thus the network controller 778 including the centralized reachability and forwarding information module 779, may be implemented in a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view. The network controller 778 includes a control synchronization module instance 881 providing mechanism performing operations related to FIGS. 1-6. The control synchronization module instance 881 causes NEs to update a first subset of forwarding table entries from a set of one or more forwarding table entries to include a post-synchronization indicator; and to delete, following the update of the first subset of forwarding table entries, a second subset of zero or more forwarding table entries from the set of forwarding table entries, where each forwarding table entry from the second subset includes a pre-synchronization indicator as described with respect to embodiments of the FIGS. 1-6.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) (RFC 793 and 1180) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit (RFC 1180, 955, and 1644) is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS) (RFC 3031), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a network controller of a control plane in a software defined network (SDN) coupled to a network element (NE) of a data plane in the SDN, of resynchronizing forwarding table entries of the NE according to forwarding table entries of the network controller, the method comprising:
   causing the NE to update a first subset of forwarding table entries from a set of one or more of forwarding table entries to include a post-synchronization indicator; and
   causing the NE to delete, following the update of the first subset of forwarding table entries, a second subset of zero or more forwarding table entries from the set of forwarding table entries, wherein each forwarding table entry from the second subset includes a pre-synchronization indicator.

2. The method of claim 1, further comprising detecting a resynchronization event, and wherein each forwarding table entry from the first subset and the second subset of forwarding table entries include the pre-synchronization indicator prior to the detecting of the resynchronization event.

3. The method of claim 2, wherein the causing the NE to update the first subset of forwarding table entries includes:
   responsive to detecting the resynchronization event, identifying the first subset of forwarding table entries based on the forwarding table entries of the network controller;
   identifying the post-synchronization indicator associated with the set of forwarding table entries; and
   sending a message to the NE to update the first subset of forwarding table entries to include the post-synchronization indicator.

4. The method of claim 1, wherein the causing the NE to delete the second subset of forwarding table entries includes:
   identifying the pre-synchronization indicator, wherein the pre-synchronization indicator is associated with the set of forwarding table entries; and
   sending a message to the NE, following the update of the first subset of forwarding table entries, to delete forwarding table entries identified based on the pre-synchronization indicator, wherein the forwarding table entries identified based on the pre-synchronization indicator are the second subset of forwarding table entries.

5. The method of claim 1, wherein the pre-synchronization indicator and the post-synchronization indicator are selected, at an initialization stage, to be associated with the set of forwarding entries.

6. The method of claim 5, wherein the set of forwarding table entries is a set of flow table entries associated with a family of flows, and the post-synchronization indicator and pre-synchronization indicator are a pair of cookie values associated with the family of flows.

7. The method of claim 6, wherein the post-synchronization indicator and the pre-synchronization indicator are further identified by a cookie mask associated with the family of flows.

8. The method of claim 5, wherein the set of forwarding table entries is a set of group table entries associated with a family of groups, and the post synchronization indicator and pre-synchronization indicator include a group property identified at least in part using a pair of cookie values associated with the family of groups.

9. The method of claim 8, wherein the group property is further identified by a cookie mask associated with the family of flows.

10. A network controller of a control plane in a software defined network (SDN) coupled to a network elements (NE) of a data plane in the SDN, comprising:
a processor and a memory, said memory containing instructions executable by the processor whereby the network controller is operative to:
cause the NE to update a first subset of forwarding table entries from a set of one or more forwarding table entries to include a post-synchronization indicator; and
cause the NE to delete, following the update of the first subset of forwarding table entries, a second subset of zero or more forwarding table entries from the set of forwarding table entries, wherein each forwarding table entry from the second subset includes a pre-synchronization indicator.

11. The network controller of claim 10, further operative to detect a resynchronization event, and wherein each forwarding table entry from the first subset and the second subset of forwarding table entries include the pre-synchronization indicator prior to the detecting of the resynchronization event.

12. The network controller of claim 11, wherein to cause the NE to update the synchronization indicator includes:
responsive to detecting the resynchronization event, to identify the first subset of forwarding table entries based on the forwarding table entries of the network controller;
to identify the post-synchronization indicator associated with the set of forwarding table entries; and
to send a message to the NE to update the first subset of forwarding table entries to include the post-synchronization indicator.

13. The network controller of claim 10, wherein to cause the NE to delete the second subset of forwarding table entries includes:
to identify the pre-synchronization indicator, wherein the pre-synchronization indicator is associated with the set of forwarding table entries; and
to send a message to the NE, following the update of the first subset of forwarding table entries, to delete forwarding table entries identified based on the pre-synchronization indicator, wherein the forwarding table entries identified based on the pre-synchronization indicator are the second subset of forwarding table entries.

14. The network controller of claim 10, wherein the pre-synchronization indicator and the post-synchronization indicator are selected, at an initialization stage, to be associated with the set of forwarding entries.

15. A non-transitory computer-readable storage medium having instructions stored therein, wherein the instructions, when executed by a processor of a network controller of a control plane in a software defined network (SDN) coupled to a network elements (NE) of a data plane in the SDN, cause the processor to perform operations comprising:
causing the NE to update a first subset of forwarding table entries from a set of one or more forwarding table entries to include a post-synchronization indicator; and
causing the NE to delete, following the update of the first subset of forwarding table entries, a second subset of zero or more forwarding table entries from the set of forwarding table entries, wherein each forwarding table entry from the second subset includes a pre-synchronization indicator.

16. The non-transitory computer-readable storage medium of claim 15, wherein the operations further comprise detecting a resynchronization event, and wherein each forwarding table entry from the first subset and the second subset of forwarding table entries include the pre-synchronization indicator prior to the detecting of the resynchronization event.

17. The non-transitory computer-readable storage medium of claim 16, wherein the causing the NE to update the first subset of forwarding table entries includes:
responsive to detecting the resynchronization event, identifying the first subset of forwarding table entries based on the forwarding table entries of the network controller;
identifying the post-synchronization indicator associated with the set of forwarding table entries; and
sending a message to the NE to update the first subset of forwarding table entries to include the post-synchronization indicator.

18. The non-transitory computer-readable storage medium of claim 15, wherein the causing the NE to delete the second subset of forwarding table entries includes:
identifying the pre-synchronization indicator, wherein the pre-synchronization indicator is associated with the set of forwarding table entries; and
sending a message to the NE, following the update of the first subset of forwarding table entries, to delete forwarding table entries identified based on the pre-synchronization indicator, wherein the forwarding table entries identified based on the pre-synchronization indicator are the second subset of forwarding table entries.

19. The non-transitory computer-readable storage medium of claim 15, wherein the pre-synchronization indicator and the post-synchronization indicator are selected, at an initialization stage, to be associated with the set of forwarding entries.

* * * * *